J. H. E. BOYKIN.
Wheel for Vehicles.
No. 160,642.    Patented March 9, 1875.
FIG I
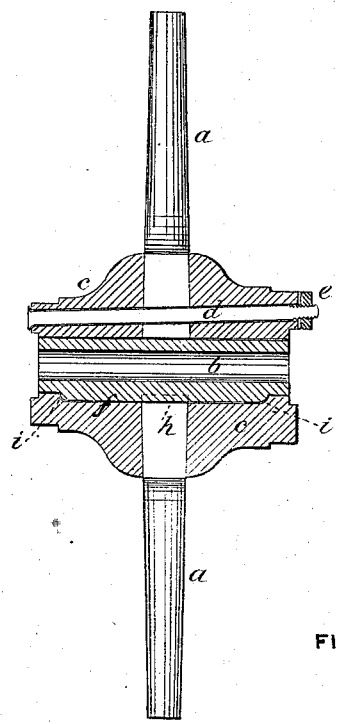
FIG III
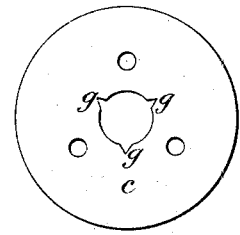
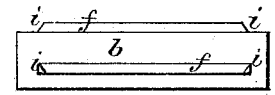
FIG II
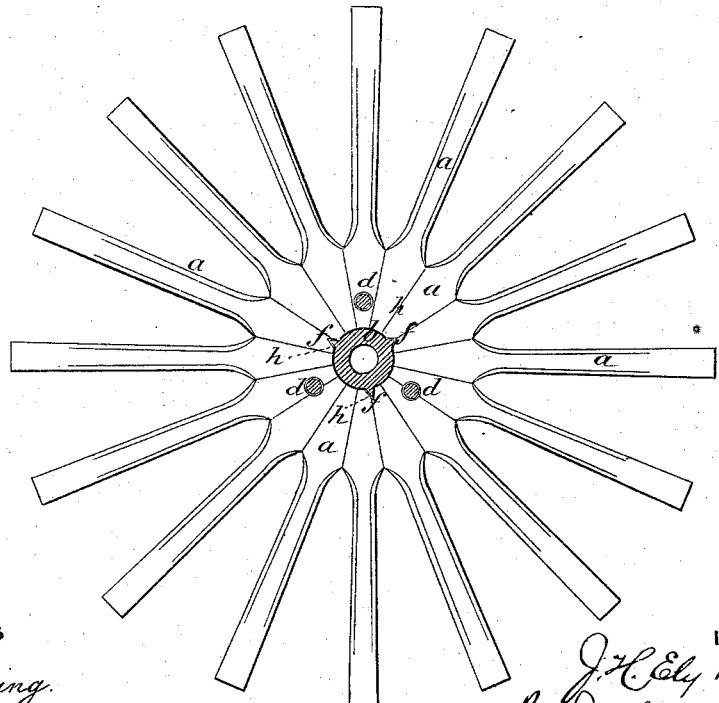
WITNESSES
John E. Laing.
J. H. Rutherford.
INVENTOR
J. H. Ely Boykin
By Johnson and Johnson
his Attys

UNITED STATES PATENT OFFICE.

J. H. ELEY BOYKIN, OF GADSDEN, TENNESSEE.

IMPROVEMENT IN WHEELS FOR VEHICLES.

Specification forming part of Letters Patent No. 160,642, dated March 9, 1875; application filed February 3, 1875.

*To all whom it may concern:*

Be it known that I, J. H. ELEY BOYKIN, of Gadsden, in the county of Crockett and State of Tennessee, have invented certain new and useful Improvements in Carriage-Wheels; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to that class of wheels for vehicles in which the spokes are beveled to the line of the radiuses of the circle, so as to be wedged together between a two-part hub, and glued at their contiguous ends, to form a frame of spokes, clamped solidly by the said hub-sections. In such wheels the wooden hub-sections have been secured to flanged shells, and with the flanges embracing the spokes, and clamped together by bolts. In practice, however, the wooden hub-sections shrink and leave the shells and the spoke-frame, and these thereby become loose. Besides this, the clamping flanged shells are expensive, and require considerable fitting, both upon the hub and to the spoke-frame.

My invention avoids these objections; and it consists in the combination, with separate hub ends and frame of spokes, with a box provided with outer surface-ribs, of less length than that of the box, arranged to fit into grooves in the separate hub ends and inner ends of the spokes, whereby the hub-box is rendered self-fastening, both in the direction of its length and at right angles thereto. Also, in the combination in a wheel having separate hub ends, and a frame of spokes, of a box having ribs arranged to pass through notches in the bearing ends of the spokes and into the grooved hub ends, whereby the box is fastened alike with the spoke-frame and the hub ends.

In the accompanying drawings, Figure 1 represents a vertical section of a wheel embracing my invention; Fig. 2, a view with one of the hub ends removed, and Fig. 3 an inner face view of one of the hub ends.

The spokes $a$ are beveled to the line of the radiuses of the wheel, and fitted and glued or otherwise secured together, so as to form a united frame, with their inner ends bearing upon the hub-box $b$. Separate hub ends $c$ $c$, either of metal or wood, are fitted so as to embrace the sides of the beveled spoke-bases, and they are clamped in this position solidly against the united ends of the spokes by means of screw-bolts $d$, three or more, passing through openings in the hub ends, and through the spoke-frame, and secured by screw-nuts $e$, clamped against the inner end of the hub, so as to draw all the parts together, to render both the hub ends and the spokes solid and firm, while giving the advantage of allowing the separation of the hub ends, to take out a broken spoke and replace it by a new one. The hub ends can be tightened from time to time.

In connection with these separate hub ends, clamped as described, the box $b$ is provided with surface ribs or fins $f$, over which grooves $g$, in the bore of the hub ends are driven, to prevent the box from turning, or the hub ends thereon; and as these ribs or fins $f$ pass through notches $h$ in the inner ends of the spokes, they also secure the box to the frame of spokes. Moreover, these ribs or fins being of less length than the box, and the grooves $g$ terminating within the hub ends, the ribs and grooves thereby form stops $i$, Fig. 1, to prevent any lengthwise movement of the box in the hub, and thus make the box self-fastening within the hub.

In replacing a broken spoke, the hub ends are removed by unscrewing the nuts and driving out the bolts.

The box $b$ is fitted within the hub ends from their inner sides.

I claim—

1. The combination, with the separate hub ends $c$ $c$, of a box, $b$, provided with ribs or fins $f$, of less length than the said box, and to fit into grooves $g$ in the hub ends, substantially as and for the purpose described.

2. The combination, in a wheel having separate hub ends $c$ $c$, and a frame of spokes, of a box, $b$, having ribs $f$, to pass through notches $h$ in the bearing ends of the spokes, and into the grooved hub ends, whereby the box is fastened alike with the spoke-frame and the hub ends, as described.

In testimony that I claim the foregoing as my own I have affixed my signature in presence of two witnesses.

J. H. E. BOYKIN.

Witnesses:
R. G. SAUNDERS,
JOHN W. MATTHEWS.